UNITED STATES PATENT OFFICE.

EDWIN W. GROVE, OF ST. LOUIS, MISSOURI.

QUININ COMPOUND.

SPECIFICATION forming part of Letters Patent No. 633,448, dated September 19, 1899.

Application filed July 19, 1898. Serial No. 686,344. (No specimens.)

*To all whom it may concern:*

Be it known that I, EDWIN W. GROVE, a citizen of the United States, residing at St. Louis, in the State of Missouri, have invented new and useful Improvements in Tasteless Quinine Compounds, of which the following is a specification.

My invention relates to a free-running quinine powder compound which is free from the disagreeable taste of the quinine during ingestion, the particles or granules of which comprise a union of a derivative of cinchona bark and a substance which is practically insoluble in the saliva of the mouth, or, in other words, a powder in which the particles of the derivative of cinchona bark are carried and enveloped or protected by a substance insoluble in the saliva of the mouth.

The object of my invention is the rendering or producing quinine in a free-running powdered form in such manner as to be free of the disagreeable taste of the quinine, so that it can be administered dry on the tongue and followed by a swallow of water, thus doing away with pills and capsules. The production of quinine or derivative of cinchona bark in a condition free of the quinine taste and the administry thereof in a powdered form will fill a long-felt want in administering quinine to infants who cannot swallow pills or capsules and also to adults who object to pills and capsules.

The quinine powder, which I prefer to produce by the process hereinafter described, when finished is free running or unconfined and free from the taste of the quinine because it is insoluble in the mouth provided it be not held there longer than is necessary—that is, during ingestion. In other words, it is practically insoluble in the saliva of the mouth and it dissolves more readily in the stomach than does the sulphate of quinine when administered incased in capsules or sugar or gelatin coated pills.

In preparing my quinine powder I prefer to employ the following process: I take of quinine, or any salt of quinia, or an alkaloid of cinchona bark, three hundred ounces; paraffine wax, one-fourth the amount, by weight, or seventy-five ounces. To the three hundred ounces of quinine I add a sufficient quantity of alcohol, ether, or other suitable liquid which will dissolve the quinine. I take the soft paraffine wax and dissolve it in the same manner. Thus far I have made two solutions, a solution of quinine and a solution of paraffine wax. I put these two solutions together and thoroughly mix the same, and when the solutions are thoroughly mixed or united I apply a sufficient amount of heat by water-bath to evaporate the alcohol, ether, or other dissolvent agent used and continue this process until a perfectly dry and homogeneous mass is obtained. I then take the mass thus produced and reduce it to a fine powder, the particles or granules of which comprise a union of a derivative of cinchona bark—such as quinine, quinidia, cinchonidia, cinchonia, or any of the alkaloids of cinchona bark or any of their salts—and a substance practically insoluble in the saliva of the mouth.

During the treatment the paraffine wax will have taken up the quinine, so that the latter is enveloped or protected from the saliva of the mouth.

In carrying out the process set forth I can use as a dissolving agent alcohol, ether, or any other liquid in which both paraffine wax and quinine are soluble. In place of the paraffine wax I can use any other substance which is practically insoluble in the mouth and which will therefore render the compound free from bitter taste.

The product of the process above described is a free-running powder the particles or granules of which comprise a derivative of cinchona bark—such as quinine, quinidia, cinchonidia, cinchonia, or any of the alkaloids of cinchona bark or any of their salts—depending upon which is used, carried, or enveloped and protected from the taste by a substance practically insoluble in the saliva or water of the mouth.

While the paraffine wax, preferably used by me and the particles of which are granularly united with quinine to render the latter tasteless in the mouth, is less soluble in the stomach than gelatin, I have found by practical tests that the union therewith of the quinine (which is very susceptible to the action of the acids of the stomach) renders the wax more soluble than gelatin in the stomach. One reason for this is that with the coated pills or capsules the stomach has only one large substance upon which to work, while by administering the compound above described in a fine powder it gives the stomach a large number of small articles upon which to act, thus rendering it more easy of digestion and assimilation than when given in capsules or pills. For the same reason calomel—an insoluble substance—is rendered more potent and more easily assimilated by triturating or reducing it to a very fine powder, thus giving the stomach a large surface upon which to do its work.

I have set forth what I consider to be the preferable process or method of producing my improved quinine powder; but I wish it understood that I do not confine myself to such process, as other ways of producing the compound may be employed without departing from the spirit of my invention, which resides in the compound irrespective of the process by which it may be produced.

Having thus described my invention, what I claim, and desire to secure by Letters Patent, is—

1. The herein-described free-running quinine powder, the granules or particles of which comprise a derivative of cinchona bark carried and protected from the taste by a substance practically insoluble in the water of the mouth.

2. The herein-described free-running quinine powder, the granules or particles of which comprise a derivative of cinchona bark carried and protected from the taste by a waxy substance practically insoluble in the water of the mouth, substantially as specified.

3. The herein-described free-running quinine powder, the granules or particles of which comprise a derivative of cinchona bark carried and protected from the taste by paraffine which is practically insoluble in the water of the mouth, substantially as described.

4. The herein-described free-running quinine powder, the granules or particles of which comprise a derivative of cinchona bark enveloped and protected from the taste by a substance practically insoluble in the water of the mouth.

5. The herein-described free-running quinine powder, the granules or particles of which comprise a derivative of cinchona bark enveloped and protected from the taste by a waxy substance practically insoluble in the water of the mouth, substantially as specified.

6. The herein-described free-running quinine powder, the granules or particles of which comprise a derivative of cinchona bark enveloped and protected from the taste by paraffine which is practicably insoluble in the water of the mouth, substantially as described.

In testimony whereof I have hereunto set my hand in presence of two subscribing witnesses.

EDWIN W. GROVE.

Witnesses:
JAMES L. NORRIS,
F. B. KEEFER.